(12) United States Patent  
Limbasiya et al.

(10) Patent No.: US 11,201,586 B2  
(45) Date of Patent: Dec. 14, 2021

(54) SOLAR PANEL ARRAY PERFORMANCE TESTING SYSTEM WITH DEFINED TIME AND LOCATION ILLUMINATION

(71) Applicant: Inventus Holdings, LLC, Juno Beach, FL (US)

(72) Inventors: Jay K Limbasiya, West Palm Beach, FL (US); Hector K Lopez, Jupiter, FL (US); Michael T Rothenberg, Stuart, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 120 days.

(21) Appl. No.: 16/504,939

(22) Filed: Jul. 8, 2019

(65) Prior Publication Data

US 2021/0013832 A1  Jan. 14, 2021

(51) Int. Cl.
*H02S 50/15* (2014.01)
*H02S 50/10* (2014.01)

(52) U.S. Cl.
CPC .............. *H02S 50/15* (2014.12); *H02S 50/10* (2014.12); *Y02E 10/50* (2013.01)

(58) Field of Classification Search
CPC .................................. H02S 50/00; H02S 50/15
See application file for complete search history.

(56) References Cited

U.S. PATENT DOCUMENTS

| | | | |
|---|---|---|---|
| 8,441,276 B2 * | 5/2013 | Tsai | H02S 50/10 |
| | | | 324/761.01 |
| 9,020,636 B2 | 4/2015 | Saied | |
| 2010/0236035 A1 | 9/2010 | Young | |
| 2011/0140531 A1 | 6/2011 | Cherukupalli | |
| 2011/0265840 A1 | 11/2011 | Sela | |
| 2017/0366010 A1 * | 12/2017 | Chen | H02S 50/10 |
| 2018/0003656 A1 * | 1/2018 | Michini | H02S 50/10 |
| 2020/0083841 A1 * | 3/2020 | Chung | H02S 50/10 |

* cited by examiner

*Primary Examiner* — Melissa J Koval
*Assistant Examiner* — Joseph O Nyamogo
(74) *Attorney, Agent, or Firm* — Tarolli, Sundheim, Covell & Tummino LLP (57) ABSTRACT

One example includes a test illumination system comprising a light source and a location controller configured to generate location data associated with a real-time location of the test illumination system. The test illumination system can be configured to move relative to a solar panel array in response to a solar testing protocol to provide illumination from the light source at a defined illumination time to each solar panel of the solar panel array in a sequence to provide a voltage amplitude. The system also includes a solar panel testing controller configured to correlate the location data of the test illumination system, the defined illumination time, and the voltage amplitude for each solar panel of the solar panel array in the sequence to determine an efficacy of each solar panel of the solar panel array.

20 Claims, 4 Drawing Sheets

SOLAR PANEL ARRAY PERFORMANCE TESTING SYSTEM WITH DEFINED TIME AND LOCATION ILLUMINATION

TECHNICAL FIELD

This disclosure relates generally to solar panels, and more specifically to a solar panel performance testing system.

BACKGROUND

Renewable and natural energy sources are becoming more popular for generating power. Such renewable and natural energy sources are persistently available, require no fuel, generate no pollutants, and are more widely accepted in a more ecologically conscientious society. Such renewable and natural energy sources can be scaled to a great extent to provide renewable power plants. One such renewable power plant is a solar farm (i.e., solar park) that harnesses a large amount of solar energy to generate electricity for a public power grid to provide clean and renewable energy to a community. A solar farm can be implemented as a large-scale photovoltaic system that includes a large number of photovoltaic modules (i.e., solar panels) arranged in series to convert light directly to electricity. By utilizing a very large number of solar panels, a solar farm can supply power at a utility level, rather than to a local user or users based on building-mounted and other decentralized solar power applications.

SUMMARY

One example includes a test illumination system comprising a light source and a location controller configured to generate location data associated with a real-time location of the test illumination system. The test illumination system can be configured to move relative to a solar panel array in response to a solar testing protocol to provide illumination from the light source at a defined illumination time to each solar panel of the solar panel array in a sequence to provide a voltage amplitude. The system also includes a solar panel testing controller configured to correlate the location data of the test illumination system, the defined illumination time, and the voltage amplitude for each solar panel of the solar panel array in the sequence to determine an efficacy of each solar panel of the solar panel array.

Another example includes a method for testing a plurality of solar panels in a solar power farm. The method includes initiating a solar testing protocol at a predetermined time and activating an unmanned vehicle comprising a light source and being configured to move relative to a solar panel array in response to the solar testing protocol. The method also includes transmitting location data associated with a real-time location of the unmanned vehicle from the unmanned vehicle to a solar panel testing controller. The method also includes commanding the unmanned vehicle to provide illumination from the light source at a defined illumination time to each solar panel of the solar panel array in a sequence to provide a voltage amplitude and transmitting the voltage amplitude to the solar panel testing controller. The method further includes correlating the location data of the unmanned vehicle, the defined illumination time, and the voltage amplitude at the solar panel testing controller for each solar panel in the sequence to determine an efficacy of each solar panel of the solar panel array.

Another example includes a solar panel testing system. The system also includes an unmanned autonomous vehicle comprising a light source and a location controller configured to generate location data associated with a real-time location of the unmanned autonomous vehicle. The unmanned autonomous vehicle can be configured to move relative to a solar panel array in response to a solar testing protocol initiated by a control signal and to provide illumination from the light source at a defined illumination time to each solar panel of the solar panel array in a sequence to provide a voltage amplitude. The system also includes a solar panel testing controller configured to correlate the location data of the unmanned autonomous vehicle, the defined illumination time, and the voltage amplitude for each solar panel in the sequence to determine an efficacy of each solar panel of the solar panel array. The system further includes a graphical user interface (GUI) configured to display the efficacy of each solar panel in the solar panel array, wherein the GUI is further configured to provide an indication alarm demonstrating failure of a given solar panel of the solar panel array.

DETAILED DESCRIPTION

This disclosure relates generally to solar panels, and more specifically to a solar panel performance testing system. The solar panel performance testing system can correspond to a system that analyzes performance of solar panels in a solar array, such as part of or the entirety of a solar farm. An unmanned vehicle can be commanded to implement a solar testing protocol corresponding to a time when the rays of the Sun do not interfere with voltage measurements of the solar panels during inspection of each solar panel of the solar panel array. As an example, the solar testing protocol can correspond to a time when the Sun is substantially below the Earth's horizon (e.g., at night) to inspect each solar panel of the solar panel array. The unmanned vehicle can be configured with or provided (e.g., from a solar panel testing system) a solar panel inspection algorithm. For example, the unmanned vehicle can be provided location information (e.g., geo-spatial coordinates) for each solar panel, or can implement a predetermined route of travel that is proximal to the solar panels in the solar array, and can transmit location information corresponding to a real-time location of the unmanned vehicle (e.g., to the solar panel testing controller).

The unmanned vehicle can be configured to inspect each solar panel for damage or degradation in solar panel efficiency by providing artificial light at a predetermined illumination time (e.g., based on the solar testing protocol or based on a command from the solar panel testing controller). For example, the unmanned vehicle can be configured with a light source (e.g., a laser) that can emit an artificial light. The unmanned vehicle can be configured to apply the artificial light to each individual solar panel to stimulate the solar panel. Each solar panel can be coupled to an associated inverter that is configured to measure a direct current (DC)

voltage generated by the array of solar panels in response to the light and to convert the DC voltage to a corresponding alternating current (AC) suitable for a power grid. Therefore, the inverter can be configured to measure the voltage generated by the single solar panel in response to the illumination provided by the unmanned vehicle.

The solar panel testing controller can correspond to a computer or a program that is running on a computer (e.g., a server or a supervisory control and data acquisition (SCADA) system). The solar panel testing controller can communicate with each inverter and with the unmanned vehicle to control the solar panel testing protocol. For example, the solar panel testing controller can be configured to receive voltage information from each inverter characterizing the measured DC voltage and timestamp information indicative of a time when the DC voltage was measured by the respective inverter. As an example, the timestamp can correspond to the predefined illumination time, which can be provided to the solar panel testing controller from the unmanned vehicle or can be provided from the solar panel testing controller as a trigger signal to the unmanned vehicle to command the unmanned vehicle to provide the illumination to the solar panel. The solar panel testing controller can also receive the location information indicative of a real-time location of the unmanned vehicle. The solar panel testing controller can thus be configured to correlate the illumination time, the location information, and the voltage for each inspected solar panel to determine the efficacy for the respective solar panel. As a result, the solar panel testing controller can identify which of the solar panels is being inspected at a given time, and can determine if the solar panel is operational or if the solar panel is defective.

Figure 1:
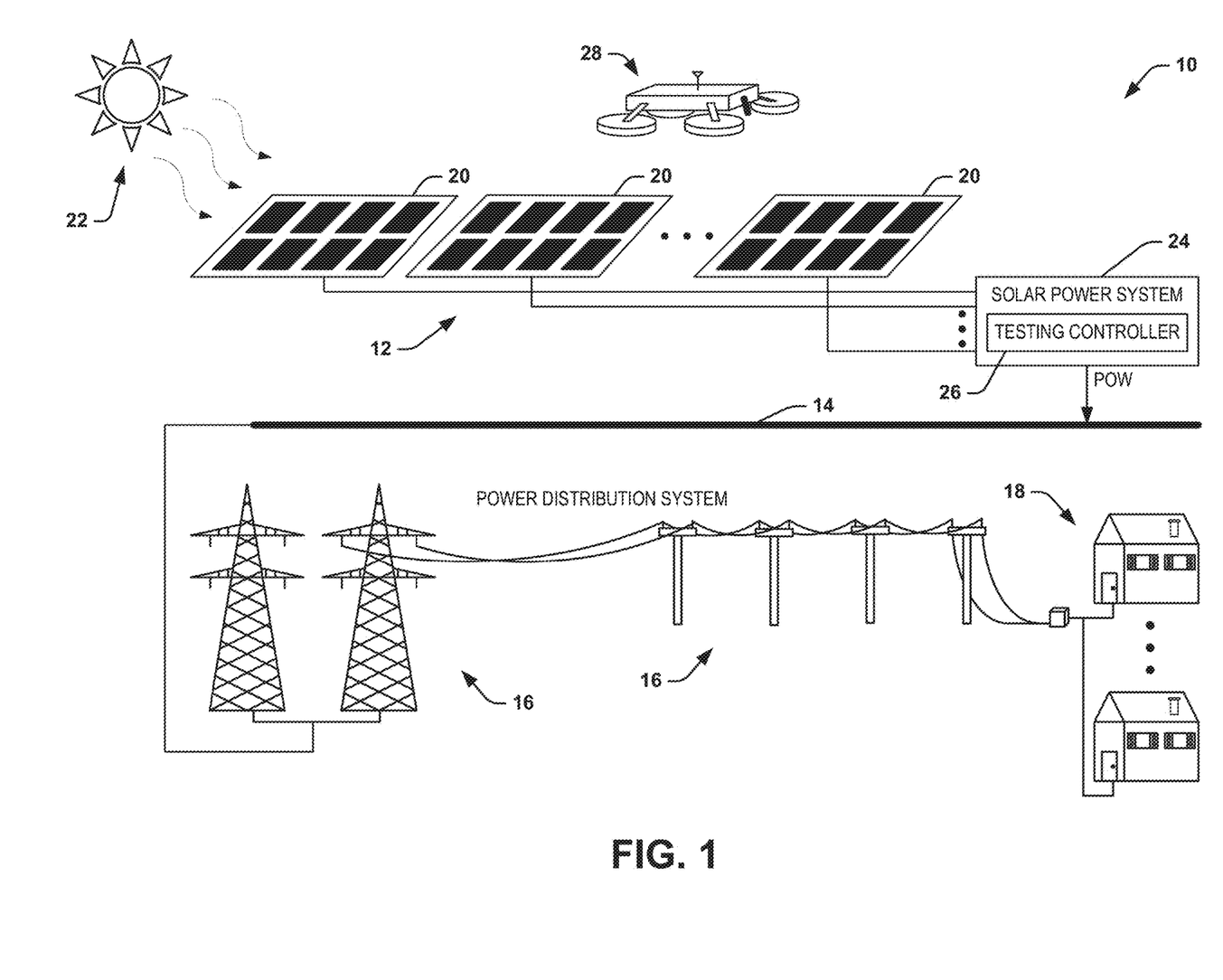
FIG. 1 illustrates an example of a utility power system.

A solar power system can be implemented in any of a variety of utility power systems, such as demonstrated in the example of FIG. 1. FIG. 1 illustrates an example of a utility power system 10. The utility power system 10 includes at least one power generator system 12 that is configured to provide power, demonstrated in the example of FIG. 1 as POW, to a power transmission system 14. The power transmission system 14 can correspond to a power bus or one or more points-of-interconnect (POIs) that provide power via a power distribution system 16 (e.g., transformers, substations, and power lines) to consumers, demonstrated generally at 18. In the example of FIG. 1, the power generator system(s) 12 are demonstrated as solar power generator system(s) that include sets of solar panels 20 configured to generate the power POW via the Sun, demonstrated at 22.

In the example of FIG. 1, the power generator system(s) 12 includes a solar power system 24 that is configured to monitor and control the power POW that is generated by the solar panels 20, such as between the power transmission system 14 and the respective power generator system(s) 12. In the example of FIG. 1, the solar power system 24 includes a solar panel testing controller ("TESTING CONTROLLER") 26 that is configured to implement a solar panel testing protocol to test each of the solar panels 20 individually in a sequence, as described herein. For example, the solar panel testing controller 26 can initiate the solar panel testing protocol at a predetermined time, such as corresponding to a time at which the Sun is below the Earth's horizon.

The solar panel testing controller 26 can thus provide commands to a test illumination system, demonstrated in the example of FIG. 1 as an unmanned vehicle 28, to implement the solar panel testing protocol. The solar panel testing protocol can correspond to the unmanned vehicle 28 illuminating each of the solar panels 20 individually in the sequence at specific times, such that the solar power system 24 can measure the voltage generated by the respective solar panel 20. The solar panel testing controller 26 can thus determine the respective solar panel 20 that is being tested at a given time based on a timestamp corresponding to an illumination time at which the light is provided via the unmanned vehicle 28 and based on location data associated with the unmanned vehicle 28. Accordingly, the solar panel testing controller 26 can determine the efficacy of the respective solar panel 20. As described herein, the term "efficacy" with respect to the solar panels 20 describes whether a solar panel is operational, and thus operating correctly to generate power as desired, or not, such as based on being defective or in need of replacement.

Figure 2:
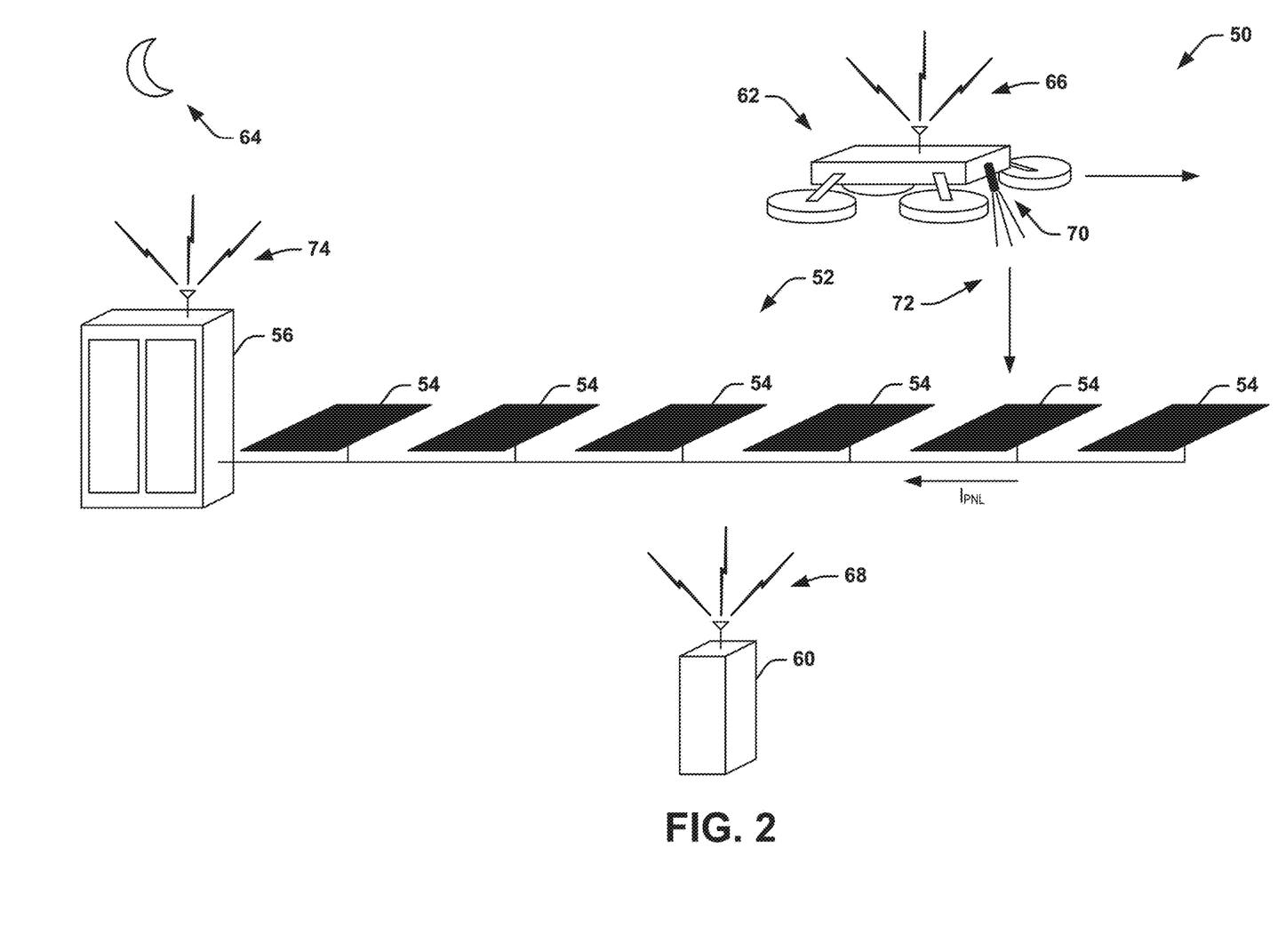
FIG. 2 illustrates an example diagram of a solar panel testing system.

FIG. 2 illustrates an example diagram 50 of a solar panel testing system. The solar panel testing system can correspond to the key components for testing the efficacy of the solar panels of a solar panel array, as described in greater detail herein.

The diagram 50 demonstrates a solar panel array 52 that is arranged as a group of series-connected solar panels 54 coupled to an inverter 56. In the example of FIG. 2, the inverter 56 is demonstrated as a control cabinet that includes an inverter, and can also include a variety of additional power control electronics (e.g., voltage/current monitors, circuit breakers, etc.). The inverter 56 is configured to provide grid voltage to the power grid in response to solar illumination during normal operating conditions. The inverter 56 also includes a transceiver and an antenna, demonstrated generally at 58, that is configured to transmit and receive data. While the transceiver 58 is demonstrated as being a wireless transceiver, it is to be understood that the transceiver 58 can also be configured as a wired (e.g., electric or fiber-optic) transceiver.

The diagram 50 also includes a solar panel testing controller 60 and a test illumination system, demonstrated in the example of FIG. 2 as an unmanned vehicle 62. The solar panel testing controller 60 is configured to implement a solar panel testing protocol to test each of the solar panels 54 individually in a sequence, as described herein. For example, the solar panel testing controller 60 can initiate the solar panel testing protocol at a predetermined time, such as corresponding to a time at night during which the Sun is below the Earth's horizon, demonstrated by the Moon 64. As a result, the solar panels 54 can be accurately tested based on mitigating noise provided via the ambient light from the Sun during normal operation of the associated solar power system during the day. As an example, the unmanned vehicle 62 can be commanded by the solar panel testing controller 60 to implement the solar panel testing protocol, such as wirelessly. For example, the unmanned vehicle 62 can be an autonomous vehicle, such that the unmanned vehicle 62 can be configured to implement the solar panel testing protocol based on a preprogrammed movement and illumination algorithm in response to a single activation command. As another example, the unmanned vehicle 62 can be controlled at the solar panel testing controller 60, such as by a user, to manually perform the solar panel testing protocol based on a sequence of user-provided control commands.

While the unmanned vehicle 62 is demonstrated in the example of FIG. 2 as an unmanned aerial vehicle (UAV), it is to be understood that the unmanned vehicle 62 can be any of a variety of different vehicle types. For example, the unmanned vehicle 62 can be a terrestrial vehicle, such as having wheels or following tracks, or can be suspended on an elevated cable track. As yet another example, while the test illumination system is demonstrated as an unmanned vehicle, it is to be understood that the test illumination system is not limited to being an unmanned vehicle. For example, the test illumination system can be configured as one or more gimballed light sources (e.g., lasers or spotlights) that can selectively rotate to provide the illumination to be incident on each of the solar panels 54 in the sequence. As described in greater detail herein, the location information can correspond to a three-dimensional illumination vector of the test illumination system to a respective one of the solar panels 54. As yet another example, the test illumination system can correspond to dedicated light sources associated with each of the respective solar panels 54, such that each of the dedicated light sources can be selectively activated to provide the illumination to the respective solar panels.

The unmanned vehicle 62 can include a location controller configured to determine a real-time location of the unmanned vehicle 62 as it moves along the solar panel array 52. The unmanned vehicle 62 can thus transmit location data corresponding to the real-time location of the unmanned vehicle 62 to the solar panel testing controller 60, demonstrated as a wireless transmission via an antenna at 66. While the communications between the solar panel testing controller 60 and the unmanned vehicle 62 are demonstrated as wireless in the example of FIG. 2, it is to be understood that the communications between the solar panel testing controller 60 and the unmanned vehicle 62 can be wired communications instead. The solar panel testing controller 60 can thus receive the location data, demonstrated generally at 68, and can thus identify the location of the unmanned vehicle 62 in real-time. Additionally, based on the location data, the solar panel testing controller 60 can identify a most proximal solar panel 54 of the solar panel array 52 to the unmanned vehicle 62.

In the example of FIG. 2, the unmanned vehicle 62 includes a light source 70 that is configured to provide illumination, demonstrated generally at 72, to the solar panels 54 of the solar panel array 52. For example, the light source 70 can be a laser, an incandescent bulb, a light-emitting diode (LED), or any other type of light source. The light source 70 can have a wavelength, intensity, and/or focus that are tuned to provide a voltage response from the respective solar panels 54.

As an example, the unmanned vehicle 62 can receive a trigger signal from the solar panel testing controller 60 to provide the illumination 72 to the most proximal or to a specific solar panel 54 of the solar panel array 52. For example, the illumination can correspond to scanning across and/or illuminating a portion of a given one of the solar panels 54, can correspond to illuminating a majority of the solar panel 54 (e.g., via a focused or shrouded beam), or illuminating a solar panel 54 with a majority of light that may also be incident on adjacent/proximal solar panels 54. The trigger signal can be provided based on the identified location of the unmanned vehicle 62, or can be based on a predefined time interval. The transmission of the trigger signal and/or an acknowledgement of activation of the illumination transmitted from the unmanned vehicle 62 to the solar panel testing controller 60 can correspond to an illumination time that can act as a timestamp for a specific time that the illumination was provided to the respective one of the solar panels 54 of the solar panel array 52. As another example, the unmanned vehicle 62 can be configured to provide the illumination based on one or more additional stimuli or events, such as based on identifying a proximal solar panel 54 using sensors, a mechanical or electrical trigger (e.g., for a terrestrial, tracked, or cable suspended unmanned vehicle 62), or any of a variety of other ways to trigger providing the illumination to a respective solar panel 54. The unmanned vehicle 62 can thus transmit a timestamp of the provided illumination to the solar panel testing controller 60 to provide the illumination time.

Therefore, based on the location data transmitted from the unmanned vehicle 62 and the illumination time, the solar panel testing controller 60 can identify the solar panel 54 that is being provided the illumination at a specific time. The inverter 56 can thus transmit voltage data, demonstrated generally at 74, to the solar panel testing controller 60, with the voltage data corresponding to a net voltage that is being provided from each of the solar panels 54 in the solar panel array 52. For example, the inverter 56 can substantially continuously transmit the voltage data to the solar panel testing controller 60, such as during the entirety of the solar panel testing protocol. While the example of FIG. 2 demonstrates that the voltage data 74 is provided from the inverter 56, it is to be understood that other devices (e.g., dedicated voltage meters) can provide the voltage information to the solar panel testing controller 60. Therefore, the example of FIG. 2 is not intended to be limited to the inverter providing the voltage data 74 to the solar panel testing controller 60.

Because the solar panel testing protocol can be performed at night, and because the illumination can be provided to only a single one of the solar panels 54 at a given time, the voltage data can thus correspond to voltage that is provided from only a single solar panel 54. As a result, the solar panel testing controller 60 can correlate the voltage data, the location data, and the illumination time to determine the efficacy of a given one of the solar panels 54. For example, the solar panel testing controller 60 can determine whether a given one of the solar panels 54 identified by the location data is providing voltage via the voltage data at the time that it was illuminated based on the illumination time. The solar panel testing controller 60 can thus perform the correlation of the voltage data, the location data, and the illumination time for each of the solar panels 54 in the solar panel array 52 in a sequence to test the efficacy of each of the solar panels 54.

As an example, the solar panel testing controller 60 can compare the voltage provided by the illumination with a predetermined voltage threshold. If the solar panel testing controller 60 determines that the respective one of the solar panels 54 is generating no voltage, or a voltage that is less than the threshold, then the solar panel testing controller 60 can determine that the respective solar panel 54 is defective. The solar panel testing controller 60 can then, for example, provide an alarm to indicate that the respective specific solar panel 54 requires maintenance (e.g., replacement). If the solar panel testing controller 60 determines that the respective one of the solar panels 54 is generating a voltage that is greater than the threshold, then the solar panel testing controller 60 can determine that the respective solar panel 54 is acceptable. As another example, in response to determining that the respective solar panel 54 is acceptable, the solar panel testing controller 60 can calculate a difference between the measured voltage and the predetermined threshold, and can calculate an estimated remaining operational life of the solar panel 54. For example, because solar panels degrade over time, the measured voltage can provide an indication of the degradation of the solar panel 54. As an example, the solar panel testing controller 60 can implement an algorithm that can incorporate predetermined degradation rates and/or previous voltage measurements for the solar panel 54 to determine the estimated remaining operational life of the respective solar panel 54.

As a result, the example of FIG. 2 and the description herein describes a manner of providing an automated manner of testing solar panels of a solar panel array. As a result, the solar panel testing methodology described herein can provide a significant time savings and cost savings relative to typical methods that require manual testing of each individual solar panel, such as requiring significant time and manpower. Given that a solar farm can include thousands of solar panels, the solar panel testing methodology described herein can provide a much more efficient manner of testing each solar panel of a respective solar farm.

Figure 3:
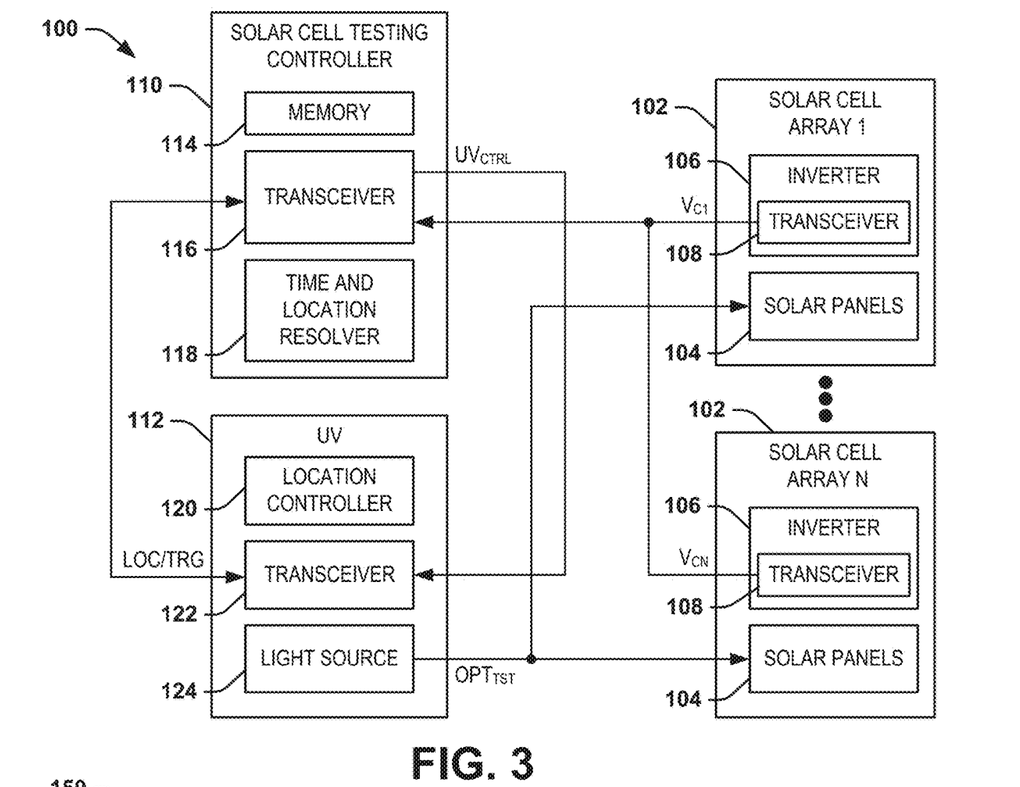
FIG. 3 illustrates an example of a solar panel testing system.

FIG. 3 illustrates an example block diagram of a solar panel testing system 100. The solar panel testing system 100 can correspond to the solar panel testing system in the example of FIG. 2. Therefore, reference is to be made to the example of FIG. 2 in the following description of the example of FIG. 3.

The solar panel testing system 100 demonstrates a plurality N of solar panel arrays 102 that can each be arranged as a group of series-connected solar panels 104 coupled to an associated inverter 106. In the example of FIG. 3, the inverter 106 includes a transceiver 108 configured to transmit and receive data. The transceiver 108 can be configured as either a wireless or a wired transceiver. The transceiver 108 of each of the solar panel arrays 102 is configured to transmit voltage data, demonstrated as $V_{C1}$ through $V_{CN}$, respectively, corresponding to an amplitude of voltage that is generated from the solar panels 104 in response to incident radiation.

The solar panel testing system 100 also includes a solar panel testing controller 110 and an unmanned vehicle 112. As an example, the solar panel testing controller 110 can be implemented as part of a master controller for the associated solar farm, such as a computer (e.g., a server or a supervisory control and data acquisition (SCADA) system). The solar panel testing controller 110 is configured to implement a solar panel testing protocol to test each of the solar panels 104 individually in a sequence, as described herein. In the example of FIG. 3, the solar panel testing controller 110 includes a memory 114, a transceiver 116, and a time and location resolver 118. The transceiver 116 can be configured to transmit and receive data between the inverter 106 of each of the solar panel arrays 112 and the unmanned vehicle 112, as described in greater detail herein.

For example, the solar panel testing controller 110 can initiate the solar panel testing protocol at a predetermined time, such as corresponding to a time at night during which the Sun is below the Earth's horizon. As a result, the solar panels 104 can be accurately tested based on mitigating noise provided via the ambient light from the Sun during normal operation of the associated solar power system during the day. As an example, the unmanned vehicle 112 can be commanded by the solar panel testing controller 110 to implement the solar panel testing protocol, such as wirelessly. For example, the unmanned vehicle 112 can be an autonomous vehicle, such that the unmanned vehicle 112 can be configured to implement the solar panel testing protocol based on a preprogrammed movement and illumination algorithm in response to a single activation command. As another example, the unmanned vehicle 112 can be controlled at the solar panel testing controller 110, such as by a user, to manually perform the solar panel testing protocol based on a sequence of user-provided control commands. The command(s) from the solar panel testing controller 110 to the unmanned vehicle 112 are demonstrated generally as a signal $UV_{CTRL}$.

The unmanned vehicle 112 includes a location controller 120, a transceiver 122, and a light source 124. The location controller 120 is configured to determine a real-time location of the unmanned vehicle 112 as it moves along the solar panel arrays 102. The transceiver 122 can thus transmit location data corresponding to the real-time location of the unmanned vehicle 112 to the transceiver 116 of the solar panel testing controller 110. In the example of FIG. 3, the location data is demonstrated as part of a bidirectional signal LOC/TRG between the transceivers 116 and 122. The solar panel testing controller 110 can thus receive the location data and can thus identify the location of the unmanned vehicle 112 in real-time. Additionally, based on the location data, as described herein, the solar panel testing controller 110 can identify a most proximal solar panel 104 of the solar panel arrays 102 to the unmanned vehicle 112.

The light source 124 that is configured to provide illumination, demonstrated as "$OPT_{TST}$", to the solar panels 104 of the solar panel arrays 102 in a sequence, such as based on the solar testing protocol. For example, the light source 118 can be a laser, an incandescent bulb, an LED, or any other type of light source. As an example, the unmanned vehicle 112 can receive a trigger signal from the solar panel testing controller 110 to provide the illumination 122 to the most proximal solar panel 104 of the solar panel arrays 102. In the example of FIG. 3, the trigger signal is demonstrated as part of the bidirectional signal LOC/TRG between the transceivers 116 and 122. The trigger signal can be provided based on the identified location of the unmanned vehicle 112, or can be based on a predefined time interval. The transmission of the trigger signal and/or an acknowledgement of activation of the illumination transmitted from the unmanned vehicle 112 to the solar panel testing controller 110 (e.g., part of the signal LOC/TRG) can correspond to an illumination time that can act as a timestamp for a specific time that the illumination was provided to the respective one of the solar panels 104 of the solar panel arrays 102. As another example, the unmanned vehicle 112 can be configured to provide the illumination based on one or more additional stimuli or events, such as based on identifying a proximal solar panel 104 using sensors, a mechanical or electrical trigger (e.g., for a terrestrial, tracked, or cable suspended unmanned vehicle 112), or any of a variety of other ways to trigger providing the illumination to a respective solar panel 104. The unmanned vehicle 112 can thus transmit a timestamp of the provided illumination to the solar panel testing controller 110 to provide the illumination time.

The solar panel testing controller 110 can be configured to store the location data, the illumination time, and the voltage data $V_{C1}$ through $V_{CN}$ in the memory 114. Therefore, based on the location data transmitted from the unmanned vehicle 112 and the illumination time, the time and location resolver 118 can identify the solar panel 104 that is being provided the illumination at a specific time. As a result, the time and location resolver 118 can correlate the voltage data, the location data, and the illumination time to determine the efficacy of a given one of the solar panels 104. For example, the time and location resolver 118 can determine whether a given one of the solar panels 104 identified by the location data is providing voltage via the voltage data at the time that it was illuminated based on the illumination time. The time and location resolver 118 can thus perform the correlation of the voltage data, the location data, and the illumination time for each of the solar panels 104 in the solar panel arrays 102 in a sequence to test the efficacy of each of the solar panels 104.

As an example, the time and location resolver 118 can compare the voltage provided by the illumination with a predetermined voltage threshold (e.g., stored in the memory 114). If the time and location resolver 118 determines that the respective one of the solar panels 104 is generating no voltage, or a voltage that is less than the threshold, then the time and location resolver 118 can determine that the respective solar panel 104 is defective. The time and location resolver 118 can then, for example, provide an alarm to indicate that the respective specific solar panel 104 requires maintenance (e.g., replacement). If the time and location resolver 118 determines that the respective one of the solar panels 104 is generating a voltage that is greater than the threshold, then the time and location resolver 118 can determine that the respective solar panel 104 is acceptable. As another example, in response to determining that the respective solar panel 104 is acceptable, the time and location resolver 118 can calculate a difference between the measured voltage and the predetermined threshold, and can calculate an estimated remaining operational life of the solar panel 104. For example, because solar panels degrade over time, the measured voltage can provide an indication of the degradation of the solar panel 104. As an example, the time and location resolver 118 can implement an algorithm that can incorporate predetermined degradation rates and/or previous voltage measurements for the solar panel 104 to determine the estimated remaining operational life of the respective solar panel 104.

As a result, the example of FIG. 3 and the description herein describes a manner of providing an automated manner of testing solar panels of a solar panel array. As a result, the solar panel testing methodology described herein can provide a significant time savings and cost savings relative to typical methods that require manual testing of each individual solar panel, such as requiring significant time and manpower. Given that a solar farm can include thousands of solar panels, the solar panel testing methodology described herein can provide a much more efficient manner of testing each solar panel of a respective solar farm.

Figure 4:
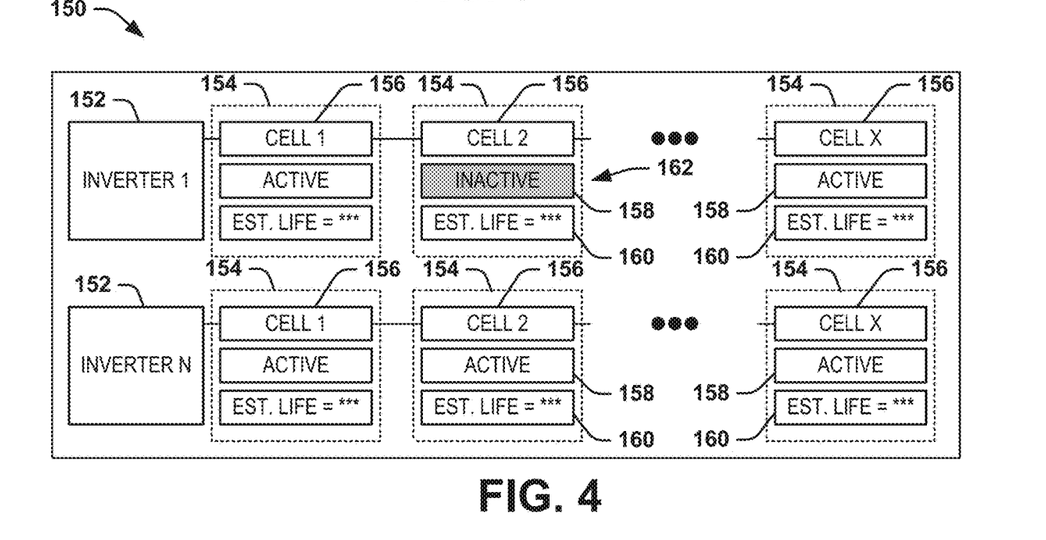
FIG. 4 illustrates an example diagram of a graphical user interface (GUI).

FIG. 4 illustrates an example diagram of a graphical user interface (GUI) 150. The GUI 150 can correspond to or be a part of the solar panel testing controller, such as the solar panel testing controller 60 or the solar panel testing controller 110. Therefore, reference is to be made to the example of FIGS. 2 and 3 in the following description of the example of FIG. 4. As described herein, the GUI 150 can provide monitoring capability for the solar panel arrays 102, and thus for the solar farm, such as during or in response to the solar panel testing protocol.

The GUI 150 includes monitoring data associated with each of the solar panel arrays 102, demonstrated as a graphical entry for each of N inverters 152 and each of X solar panels 154 associated with the respective one of the inverters 152. While it is demonstrated in the example of FIG. 4 that each of the solar panel arrays 102 includes an equal number "X" of the solar panels 154, it is to be understood that the solar panel arrays 102 are not limited to an equal number of solar panels. Each of the graphical entries for the solar panels 154 includes an identifier of the solar panel 156, an efficacy indicator 158, and an estimated life entry 160. As an example, the efficacy indicator 158 can provide an indication as to whether each of the respective solar panels 156 is active or inactive, such as in response to performing the solar panel testing protocol described herein.

Therefore, in response to a determination by the solar panel testing controller 110 (e.g., via the time and location resolver 118), the efficacy indicator 158 can be updated to indicate a status as either "ACTIVE", and thus operating according to desired parameters, or "INACTIVE", and thus requires maintenance (e.g., replacement). For example, the indication of INACTIVE, such as demonstrated at 162, can be accompanied by a flashing light, different color, and/or an audible alarm to provide the user of the GUI 150 an indication of the inactive status of the respective solar panel 154.

Additionally, the estimated life entry 160 can provide the estimated life of each of the solar panels 154, such as in response to the solar panel testing protocol. For example, as described previously, the time and location resolver 118 can calculate a difference between the measured voltage and the predetermined threshold to calculate an estimated remaining operational life of the solar panel 154 (e.g., corresponding to a respective solar panel 104). As an example, the time and location resolver 118 can implement an algorithm that can incorporate predetermined degradation rates and/or previous voltage measurements for the solar panel 154 to determine the estimated remaining operational life of the respective solar panel 154. Accordingly, the estimated life entry 160 can provide a visual indication to the user of the estimated remaining life of the respective solar panel 154. As a result, the user can provide a maintenance plan for the solar panel and/or the solar farm based on the estimated life entry 160 for each of the solar panels 154 displayed on the GUI 150.

Figure 5:
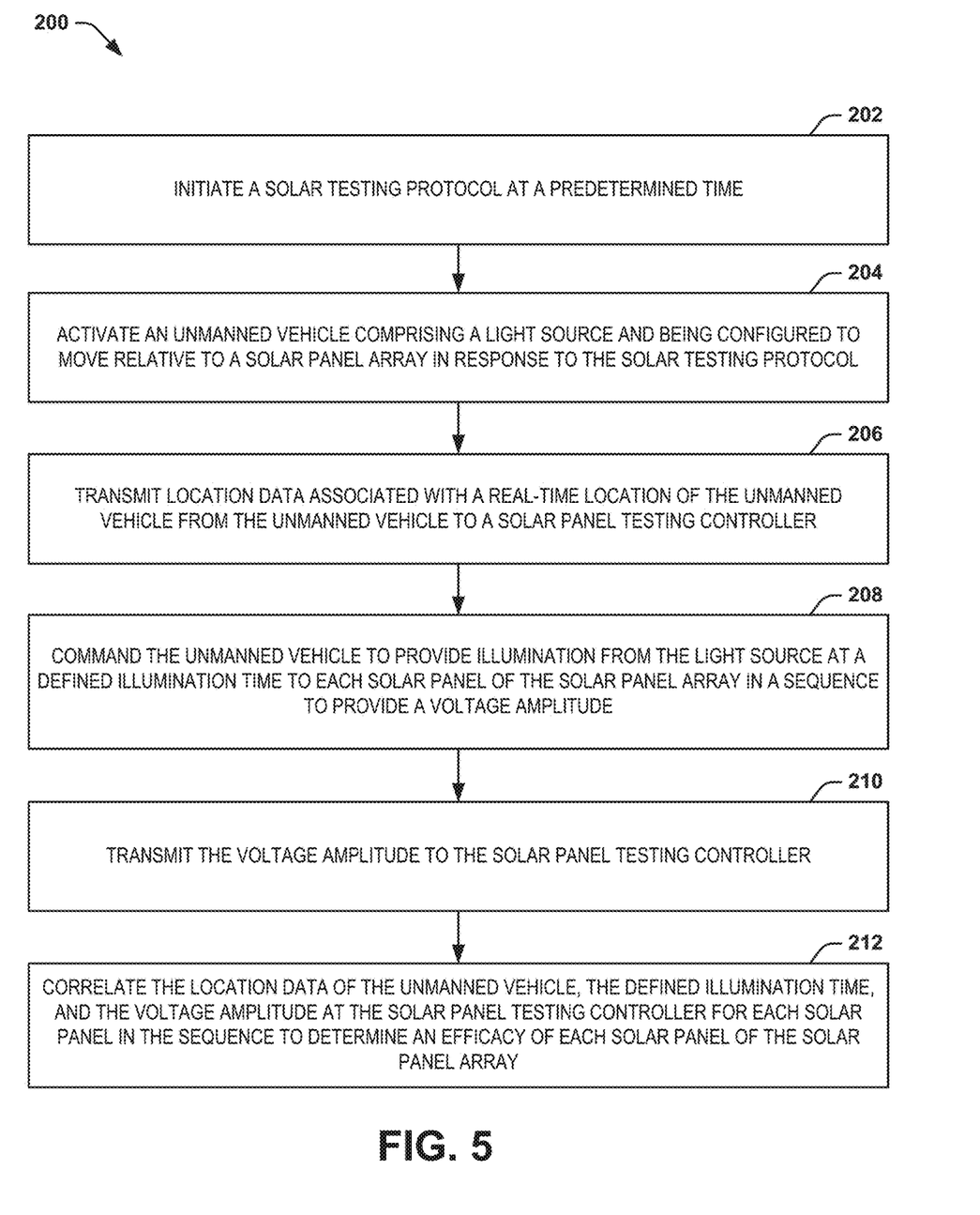
FIG. 5 illustrates an example of a method for testing a plurality of solar panels in a solar power farm.

In view of the foregoing structural and functional features described above, methods in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated orders, as some aspects could, in accordance with the present disclosure, occur in different orders and/or concurrently with other aspects from that shown and described herein. Moreover, not all illustrated features may be required to implement method in accordance with an aspect of the present disclosure.

FIG. 5 illustrates a method 200 for testing a plurality of solar panels (e.g., the solar panels 54) in a solar power farm (e.g., the power generator system(s) 12). At 202, a solar testing protocol is initiated at a predetermined time corresponding to a time at which the Sun is below the horizon. At 204, an unmanned vehicle (e.g., the unmanned vehicle 62) comprising a light source (e.g., the light source 70) and being configured to move relative to a solar panel array (e.g., the solar panel array 52) is activated in response to the solar testing protocol. At 206, location data (e.g., the location data as part of the signal LOC/TRG) associated with a real-time location of the unmanned vehicle is transmitted from the unmanned vehicle to a solar panel testing controller (e.g., the solar panel testing controller 60). At 208, the unmanned vehicle is commanded to provide illumination from the light source at a defined illumination time to each solar panel of the solar panel array in a sequence to provide a voltage amplitude at an inverter (e.g., the inverter 56) associated with the solar panel array. At 210, the voltage amplitude is transmitted to the solar panel testing controller. At 212, the location data of the unmanned vehicle, the defined illumination time, and the voltage amplitude is correlated at the solar panel testing controller to determine an efficacy of each solar panel of the solar panel array.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A solar panel testing system comprising: a test illumination system corresponding to an aerial vehicle comprising a light source and a location controller configured to generate location data associated with a real-time location of the aerial vehicle, the aerial vehicle being configured to move relative to a solar panel array in response to a solar testing protocol to provide illumination from the light source at a defined illumination time to each solar panel of the solar panel array in a sequence to provide a direct current (DC) voltage amplitude, the aerial vehicle being configured to implement the solar testing protocol in response to a control signal and provide timestamp information indicative of a time when the aerial vehicle illuminated a respective solar panel of the solar panel array, wherein each solar panel of the solar panel array is intermittently exposed to a Sun and the solar testing protocol is implemented at a first predetermined time corresponding to a time at which the Sun is below a horizon, wherein each solar panel of the solar panel array is configured to generate a grid voltage for a power grid at a second predetermined time corresponding to a time at which the Sun is above the horizon; and a solar panel testing controller configured to: receive the timestamp information and the location data from the aerial vehicle;
  receive voltage data characterizing an alternating current (AC) voltage output by an inverter coupled to at least two solar panels of the solar panel array for a period of time that includes a given time corresponding to the timestamp information provided from the aerial vehicle, wherein the DC voltage amplitude provided by each of the at least two solar panels of the solar panel array is provided to the inverter;
  determine an AC voltage amplitude output by the inverter at the given time based on the received voltage data;
  identify the respective solar panel of the solar panel array being tested based on the AC voltage amplitude at the given time and the location information provided by the aerial vehicle; and
  determine an efficacy of the respective solar panel of the solar panel array based on the AC voltage amplitude at the given time in response to identifying the respective solar panel, the solar panel testing controller being configured to provide the control signal to the aerial vehicle based on the second predetermined time corresponding to the time at which the Sun is below the horizon.

2. The system of claim 1, wherein the solar panel testing controller is configured to compare the AC voltage amplitude to a predetermined threshold to determine the efficacy of the respective solar panel of the solar panel array.

3. The system of claim 2, wherein the solar panel testing controller is configured to determine a difference between the AC voltage amplitude and the predetermined threshold, and to implement an algorithm to estimate a remaining operational life of the respective solar panel in the solar panel array based on the respective difference between the AC voltage amplitude and the predetermined threshold.

4. The system of claim 1, wherein the aerial vehicle is an unmanned autonomous vehicle.

5. The system of claim 4, wherein the unmanned autonomous vehicle is configured to wirelessly transmit the location data to the solar panel testing controller, wherein the solar panel testing controller is configured to transmit a trigger signal to the unmanned vehicle corresponding to a command to provide the illumination from the light source in response to determining that the unmanned vehicle moved to a predetermined location relative to a physical location associated with the respective solar panel of the solar panel array.

6. The system of claim 1, wherein the solar panel testing controller comprises a memory configured to store data associated with the efficacy and an estimated remaining operational life of the respective solar panel in the solar panel array based on the AC voltage amplitude associated with the respective solar panel.

7. The system of claim 1, wherein the aerial vehicle is configured to wirelessly transmit to the solar panel testing controller the timestamp information and the location data in response to moving to a predetermined location relative to a physical location associated with the respective solar panel of the solar panel array.

8. The system of claim 1, wherein the solar panel array comprises an inverter, the inverter being configured to provide the AC voltage amplitude in response to the illumination from the light source at the defined illumination time to the solar panel testing controller during the solar testing protocol, and to provide the grid voltage to the power grid in response to a solar illumination during normal operating conditions corresponding to the time at which the Sun is above the horizon.

9. The system of claim 1, wherein the solar panel testing controller comprises a graphical user interface (GUI) configured to display the efficacy of the respective solar panel in the solar panel array, wherein the GUI is further configured to provide an indication alarm demonstrating failure of the respective solar panel of the solar panel array.

10. The system of claim 1, further comprising an inverter configured to provide the AC voltage amplitude at the first predetermined time in response to the illumination provided by the light source and configured to provide the grid voltage to the power grid at the second predetermined time in response to a solar illumination from the Sun.

11. The system of claim 1, wherein the solar panel array is part of a solar power farm.

12. A method for testing a plurality of solar panels in a solar power farm, the method comprising: initiating a solar testing protocol at a first predetermined time corresponding to a time at which a Sun is below a horizon, activating an unmanned vehicle comprising a light source and being configured to move relative to a solar panel array in response to the solar testing protocol, transmitting location data associated with a real-time location of the unmanned vehicle from the unmanned vehicle to a solar panel testing controller; commanding the unmanned vehicle to provide illumination from the light source at a defined illumination time corresponding to another time at which the Sun is below the horizon to each solar panel of the solar panel array in a sequence to provide a direct current (DC) voltage amplitude, wherein each solar panel of the solar panel array is intermittently exposed to the Sun and configured to generate a grid voltage for a power grid at a second predetermined time corresponding to a time at which the Sun is above the horizon; transmitting timestamp information indicative of a time when the unmanned vehicle illuminated a respective solar panel of the solar panel array to the solar panel testing controller; receiving voltage data characterizing an alternating current (AC) voltage output by an inverter coupled to at least two solar panels of the solar panel array for a period of time that includes a given time corresponding to the timestamp information provided from the unmanned vehicle, wherein the DC voltage amplitude provided by each of the at least two solar panels of the solar panel array is provided to the inverter, determining an AC voltage amplitude output by the inverter at the given time based on the received voltage data: identifying the respective solar panel of the solar panel array being tested based on the AC voltage amplitude at the given time and the location information provided by the unmanned vehicle; and determining an efficacy of the respective solar panel of the solar panel array based on the AC voltage amplitude at the given time in response to identifying the respective solar panel.

13. The method of claim 12, further comprising comparing the AC voltage amplitude to a predetermined threshold to determine the efficacy of the respective solar panel of the solar panel array.

14. The method of claim 13, wherein comparing the AC voltage amplitude comprises determining a difference between the AC voltage amplitude and the predetermined threshold, the method further comprising implementing an algorithm to estimate a remaining operational life of the respective solar panel in the solar panel array based on the respective difference between the AC voltage amplitude and the predetermined threshold.

15. The method of claim 12, further comprising storing data associated with the efficacy and an estimated remaining operational life of the respective solar panel in the solar panel array based on the AC voltage amplitude associated with the respective solar panel.

16. The method of claim 12, further comprising:
displaying the efficacy of the respective solar panel in the solar panel array on a graphical user interface (GUI); and
providing an indication alarm demonstrating failure of the respective solar panel of the solar panel array.

17. A solar panel testing system comprising: an unmanned autonomous vehicle comprising a light source and a location controller configured to generate location data associated with a real-time location of the unmanned autonomous vehicle, the unmanned autonomous vehicle being configured to move relative to a solar panel array in response to a solar testing protocol initiated by a control signal and to provide illumination from the light source at a defined illumination time to each solar panel of the solar panel array in a sequence to provide a direct current (DC) voltage amplitude and provide timestamp information indicative of a time when the unmanned autonomous vehicle illuminated a respective solar panel of the solar panel array, wherein each solar panel of the solar panel array is intermittently exposed to a Sun and the solar testing protocol is implemented at a first predetermined time corresponding to a time at which the Sun is below a horizon, wherein each solar panel of the solar panel array is configured to generate a grid voltage for a power grid at a second predetermined time corresponding to a time at which the Sun is above the horizon; and a solar panel testing controller configured to: receive the timestamp information and the location data from the unmanned autonomous vehicle; receive voltage data characterizing an alternating current (AC) voltage output by an inverter coupled to at least two solar panels of the solar panel array for a period of time that includes a given time corresponding to the timestamp information provided from the unmanned autonomous vehicle, wherein the DC voltage amplitude provided by each of the at least two solar panels of the solar panel array is provided to the inverter; determine an AC voltage amplitude output by the inverter at the given time based on the received voltage data; identify the respective solar panel of the solar panel array being tested based on the AC voltage amplitude at the given time and the location information provided by the unmanned autonomous vehicle; and determine an efficacy of the respective solar panel of the solar panel array based on the AC voltage amplitude at the given time in response to identifying the respective solar panel, the solar panel testing controller being configured to provide the control signal to the unmanned autonomous vehicle based on the second predetermined time corresponding to the time at which the Sun is below the horizon; a graphical user interface (GUI) configured to display the efficacy of the respective solar panel in the solar panel array, wherein the GUI is further configured to provide an indication alarm demonstrating a failure of the respective solar panel of the solar panel array.

18. The system of claim 17, wherein the solar panel testing controller is configured to compare the AC voltage amplitude to a predetermined threshold to determine the efficacy of the respective each solar panel of the solar panel array, to determine a respective difference between the AC voltage amplitude and the predetermined threshold, and to implement an algorithm to estimate a remaining operational life of the respective solar panel in the solar panel array based on the respective difference between the AC voltage amplitude and the predetermined threshold.

19. The system of claim 17, wherein the unmanned autonomous vehicle is configured to wirelessly transmit to the solar panel testing controller the timestamp information and the location data in response to moving to a predetermined location relative to a physical location associated with the respective solar panel of the solar panel array.

20. The system of claim 16, wherein the unmanned autonomous vehicle is configured to wirelessly transmit the location data to the solar panel testing controller, wherein the solar panel testing controller is configured to transmit a trigger signal to the unmanned autonomous vehicle corresponding to a command to provide the illumination from the light source in response to determining that the unmanned autonomous vehicle moved to a predetermined location relative to a physical location associated with the respective solar panel of the solar panel array.

* * * * *